(12) United States Patent
Fukuoka et al.

(10) Patent No.: US 7,953,197 B2
(45) Date of Patent: May 31, 2011

(54) RADIO COMMUNICATION BASE STATION APPARATUS, RADIO COMMUNICATION MOBILE STATION APPARATUS, AND RADIO COMMUNICATION METHOD IN MULTI-CARRIER COMMUNICATION

(75) Inventors: Masaru Fukuoka, Ishikawa (JP); Sadaki Futagi, Ishikawa (JP); Atsushi Matsumoto, Ishikawa (JP); Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 11/917,758

(22) PCT Filed: Jun. 15, 2006

(86) PCT No.: PCT/JP2006/312000
§ 371 (c)(1),
(2), (4) Date: Dec. 14, 2007

(87) PCT Pub. No.: WO2006/134991
PCT Pub. Date: Dec. 21, 2006

(65) Prior Publication Data
US 2009/0233598 A1  Sep. 17, 2009

(30) Foreign Application Priority Data

Jun. 17, 2005  (JP) .................................. 2005-177780

(51) Int. Cl.
*H04L 7/00* (2006.01)
*H04L 23/00* (2006.01)
*H04B 15/00* (2006.01)

(52) U.S. Cl. .......................... 375/358; 375/285; 375/377

(58) Field of Classification Search .................. 375/358, 375/260, 267, 299, 346, 347, 350, 285, 295, 375/296, 297, 377; 455/101, 132, 91, 130, 137, 500; 370/326

See application file for complete search history.

(56) References Cited

U.S. PATENT DOCUMENTS 7,715,497 B2 *  5/2010  Miyoshi ........................ 375/316
(Continued)

FOREIGN PATENT DOCUMENTS

JP  2004-023716  1/2004
(Continued)

OTHER PUBLICATIONS

International Search Report dated Sep. 19, 2006.
(Continued)

*Primary Examiner* — Tesfaldet Bocure
(74) *Attorney, Agent, or Firm* — Dickinson Wright PLLC

(57) ABSTRACT

There is provided a mobile station device capable of effectively performing interference suppression symbol synthesis while suppressing the lowering of the transfer rate when using the repetition technique in multi-carrier communication. In the mobile station device (100), when the interference level exceeds a threshold value, a switching control unit (110) controls a switch (109) to connect a P/S unit (106) to a weight multiplication unit (113) and controls a switch (111) to connect a channel estimation unit (108) to a weight calculation unit (112). The weight calculation unit (112) calculates an interference suppression weight based on MMSE from a pilot symbol and a channel estimation value. The weight multiplication unit (113) multiplies a data symbol by the interference suppression weight. A synthesis unit (114) synthesizes the data symbol multiplied by the interference suppression weight in repetition unit.

10 Claims, 15 Drawing Sheets

FIG.3

U.S. PATENT DOCUMENTS

| | | | |
|---|---|---|---|
| 7,746,802 B2* | 6/2010 | Suh et al. | 370/252 |
| 2004/0066838 A1* | 4/2004 | Choi et al. | 375/146 |
| 2004/0248618 A1 | 12/2004 | Yoshii et al. | |
| 2005/0157803 A1* | 7/2005 | Kim et al. | 375/260 |
| 2005/0157811 A1* | 7/2005 | Bjerke et al. | 375/267 |
| 2006/0221807 A1 | 10/2006 | Fukuoka | |
| 2007/0160257 A1* | 7/2007 | Stiles | 381/421 |
| 2008/0304582 A1* | 12/2008 | Miyoshi et al. | 375/260 |
| 2009/0005101 A1* | 1/2009 | Matsumoto et al. | 455/522 |
| 2009/0109999 A1* | 4/2009 | Kuri et al. | 370/465 |
| 2009/0238123 A1* | 9/2009 | Kuri et al. | 370/329 |

FOREIGN PATENT DOCUMENTS

| | | |
|---|---|---|
| WO | 2005/006622 | 1/2005 |

OTHER PUBLICATIONS

N. Maeda et al., "Performance Comparisons between OFCDM and OFDM in a Forward Link Broadband Channel," The Institute of Electronics, Information and Communication Engineers, Technical Report of IEICE HCS2002-1629, Aug. 2002, pp. 95-100.

Chinese Office Action dated Mar. 23, 2011.

\* cited by examiner

| ON NORMAL CONDITION: RF=1 | WHEN RF=2 REQUESTED |
|---|---|
| MCS1: R=1/8, QPSK | MCS1': R=1/4, QPSK |
| MCS2: R=1/2, QPSK | MCS2': R=1/2, 16QAM |
| MCS3: R=1/3, 16QAM | MCS3': R=2/3, 16QAM |

FIG.4

RADIO COMMUNICATION BASE STATION APPARATUS, RADIO COMMUNICATION MOBILE STATION APPARATUS, AND RADIO COMMUNICATION METHOD IN MULTI-CARRIER COMMUNICATION

TECHNICAL FIELD

The present invention relates to a radio communication base station apparatus, radio communication mobile station apparatus and radio communication method in multicarrier communication.

BACKGROUND ART

In the field of wireless communication, especially in mobile communication, a variety of information such as image and data in addition to voice is becoming transmission targets in recent years. It is anticipated that the demand for high-speed transmission becomes further increased in the future, and to perform high-speed transmission, a wireless transmission scheme, which utilizes limited frequency resources more effectively to achieve high transmission efficiency, has been required.

OFDM (Orthogonal Frequency Division Multiplexing) is one of wireless transmission techniques, for meeting these requirements. OFDM is one of multicarrier communication techniques, whereby data is transmitted in parallel using a large number of subcarriers, and it is known that OFDM provides high frequency efficiency and reducing inter-symbol interference under a multipath environment and is effective to improve transmission efficiency.

In OFDM, the quality of each subcarrier may greatly fluctuate depending on frequency selective fading due to multipath. In this case, since the signal allocated to a subcarrier at a position of a fading valley has a poor quality, thus making demodulation thereof difficult, the quality of the signal needs to be improved so as to make demodulation possible.

A technique for improving the quality in OFDM is the so-called repetition. The repetition is a technique in which a certain symbol is repeated to generate a plurality of same symbols, and these same symbols are allocated to a plurality of different subcarriers or different times to be transmitted. These same symbols are subjected to maximum ratio combining at the receiver side, whereby a diversity gain can be obtained (refer to Non-Patent Document 1, for instance).

Non-Patent Document 1: Maeda, Atarashi, Kishiyama, Sawahashi "Performance Comparison between OFCDM and OFDM in a Forward Link Broadband Channel", Technical Report of IEICE.RCS2002-162, August 2002

DISCLOSURE OF INVENTION

Problems to be Solved by the Invention

Here, since the influence of interference (colored interferences) from a neighboring cell in a radio communication mobile station apparatus (hereinafter simply referred to as "mobile station") located near a cell boundary is great, there are cases when a required quality is not achieved, even if the maximum ratio combining is performed on the plurality of same symbols that have been repeated in the radio communication base station apparatus (hereinafter simply referred to as "base station").

To suppress such interferences in an effective manner, interference mitigating symbol combining (hereinafter referred to as "MMSE (Minimum Mean Square Error) combining") is performed with respect to these same symbols, based on MMSE. In this case, if repetition is not performed with respect to both the desired wave and the interfering wave in the mobile station, a weight to be used in MMSE combining cannot be calculated. Also, while repetition helps improve received quality, it also causes a decrease of transmission rate.

It is therefore an object of the present invention is to provide a base station, a mobile station and a radio communication method that enable effective performance of interference mitigating symbol combining and that prevent a decrease of the transmission rate, when the repetition is used in multicarrier communication.

Means for Solving the Problem

The base station of the present invention employs a configuration having: a radio communication base station apparatus that transmits a multicarrier signal formed with a plurality of subcarriers; a repetition section that repeats a symbol to generate a plurality of same symbols in response to a request from a radio communication mobile station apparatus or a radio communication base station apparatus of a neighboring cell; a modulation and coding scheme control section that changes, when the repetition section performs the repetition, at least one of an modulation level and a coding rate of the symbol; and a transmission section that transmits the multicarrier signal in which the plurality of same symbols are allocated to the plurality of subcarriers.

ADVANTAGEOUS EFFECTS OF THE INVENTION

According to the present invention, when the repetition is used in multicarrier communication, it is possible to perform interference mitigating symbol combining effectively and prevent a decrease of a transmission rate.

BRIEF DESCRIPTION OF DRAWINGS

FIG. 4 is an MCS table according to Embodiment 1 of the present Invention;

BEST MODE FOR CARRYING OUT THE INVENTION

Embodiments of the present invention will be described below in detail with reference to the accompanying drawings.

Embodiment 1

Figure 1:
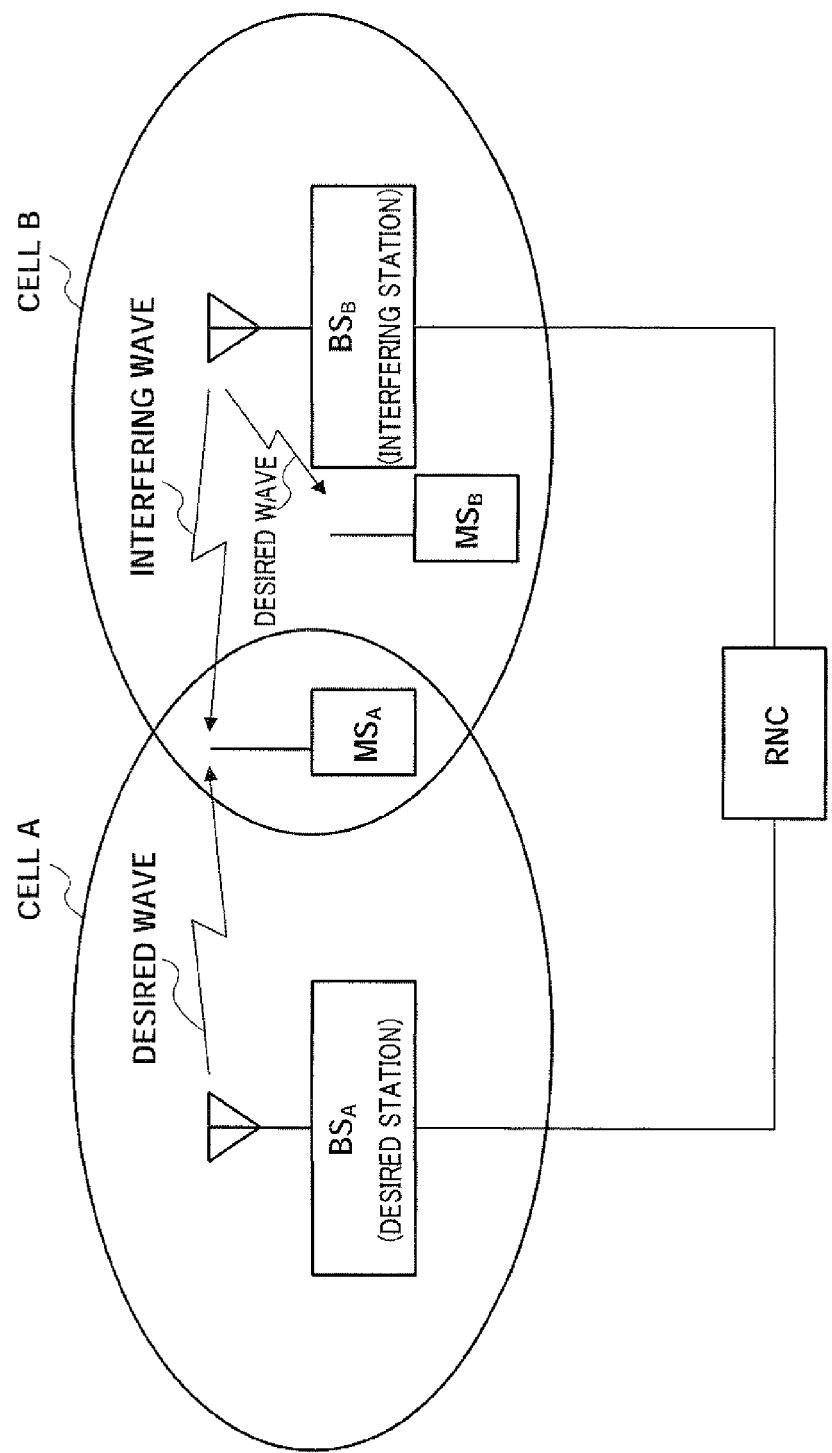
FIG. 1 is a configuration diagram (pattern 1) showing a mobile communication system, according to Embodiment 1 of the present invention.

First, FIG. 1 shows the configuration of a mobile communication system according to the present embodiment.

As shown in FIG. 1, a case will be explained with the present embodiment where mobile station $MS_A$ is engaged in communication with base station $BS_A$ of cell A and is located near the cell boundary of cell A. A case will be also explained here where a cell B is the neighboring cell of cell A. Consequently, as shown in FIG. 1 for mobile station $MS_A$, base station $BS_A$ is the desired station and base station $BS_B$ is an interfering station. In other words, data transmitted from base station $BS_A$ to mobile station $MS_A$ located in cell A is the desired wave for mobile station $MS_A$, and data transmitted from base station $BS_B$ to mobile station $MS_B$ located in cell B is the desired wave for mobile station $MS_B$ and an interfering wave for mobile station $MS_A$. In addition, base stations $BS_A$ and $BS_B$ are connected to a radio network control station apparatus (hereinafter simply "control station") RNC (Radio Network Controller) through a wired network.

In this way, when cell A and cell B are neighbors and when mobile station $MS_A$ is located near the cell boundary of cell A, mobile station $MS_A$ receives data from base station $BS_A$ as a desired wave. At the same time, mobile station $MS_A$ also has to receive data from base station $BS_B$ as an interfering wave. Then, when mobile station $MS_A$ is located near the cell boundary of cell A, by performing MMSE combining over these data, mobile station $MS_A$ suppresses the interfering wave from base station $BS_B$.

Figure 2:
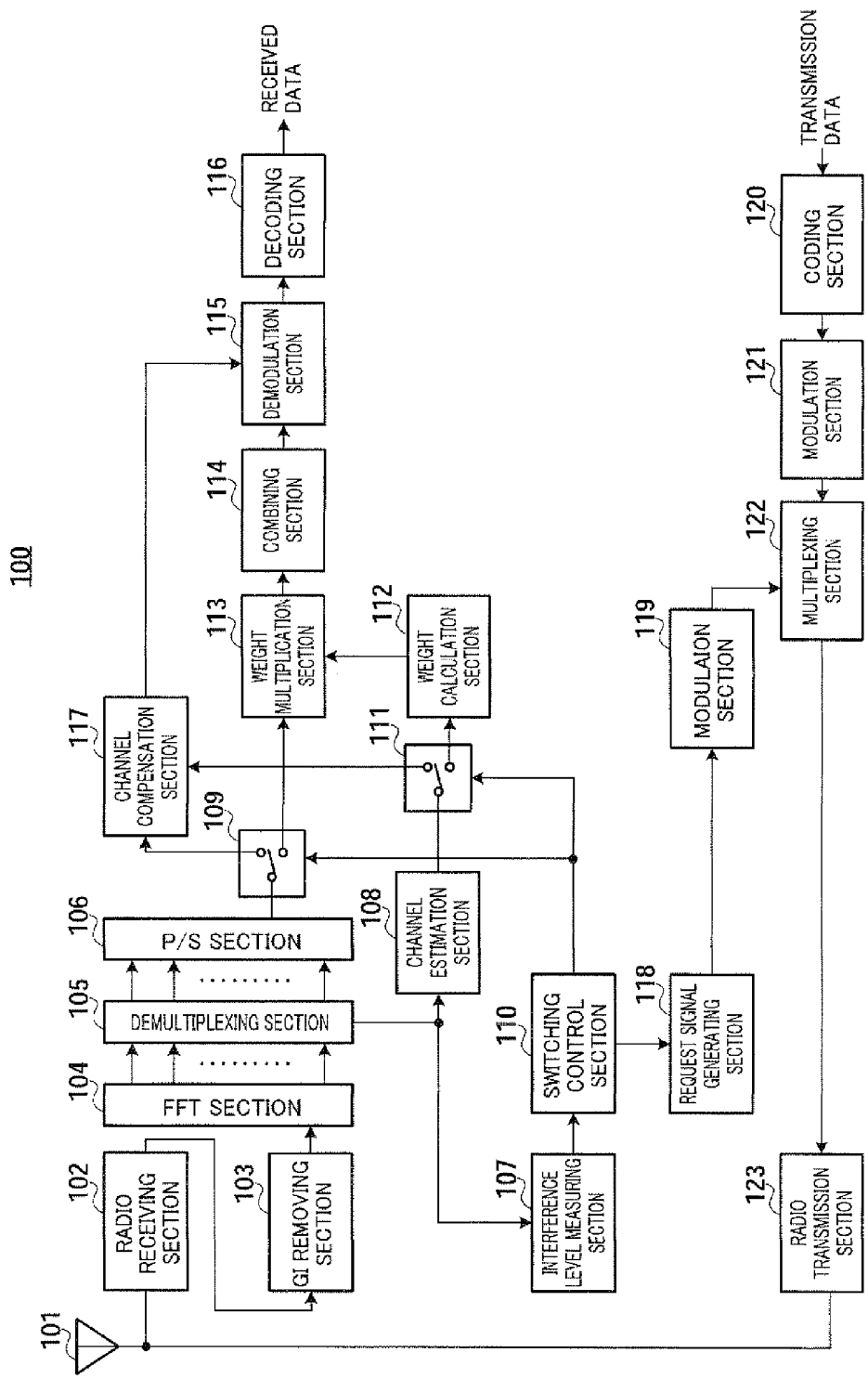
FIG. 2 is a block diagram showing a configuration of a mobile station, according to Embodiment 1 of the present invention.
Figure 3:
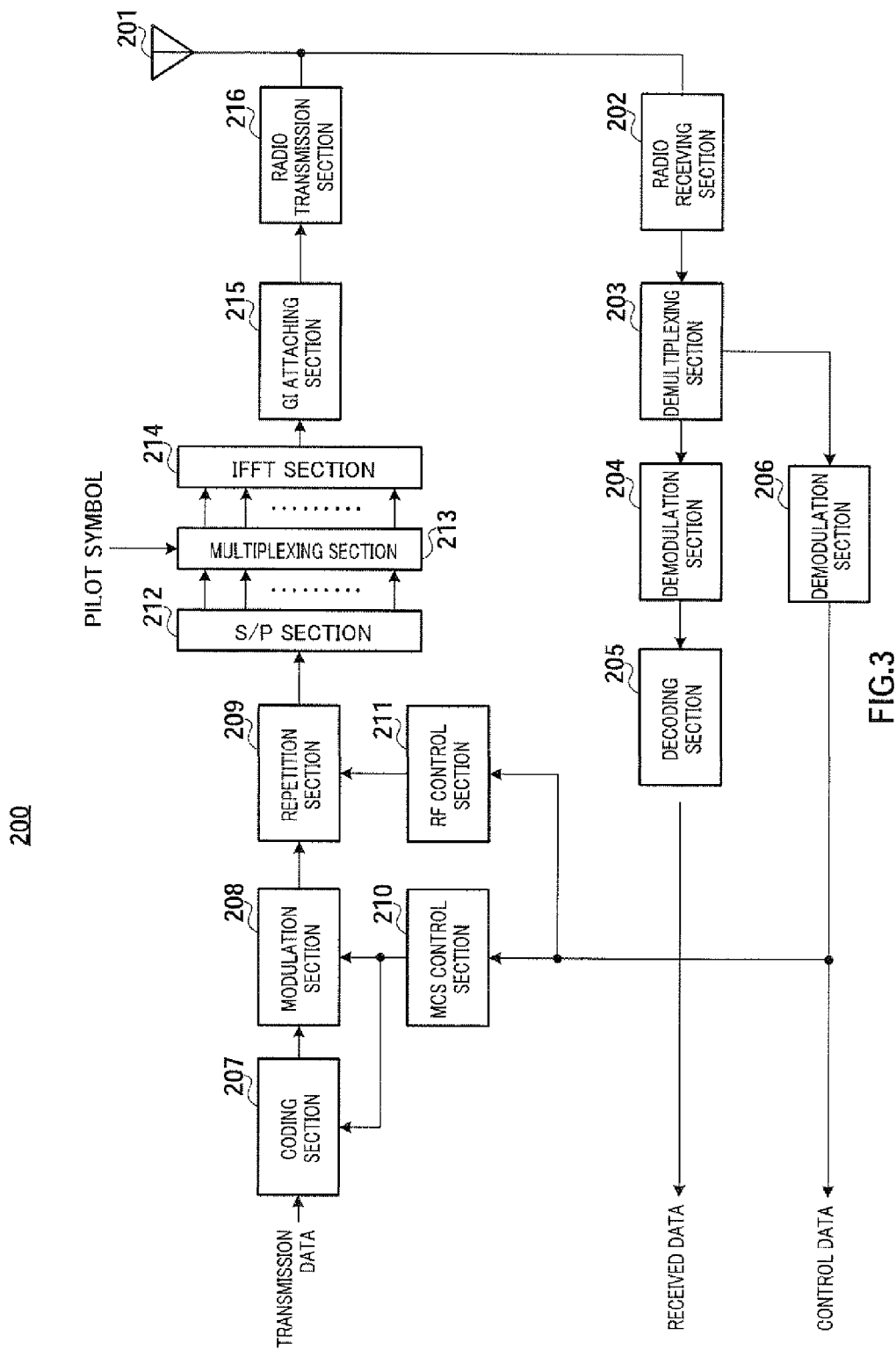
FIG. 3 is a block diagram showing a configuration of a base station, according to Embodiment 1 of the present invention.

Next, FIG. 2 shows the configuration of mobile station 100 according to the present embodiment, and FIG. 3 shows the configuration of base station 200 according to the present embodiment. In the present embodiment, mobile stations $MS_A$ and $MS_B$ shown in FIG. 1 both employ the configuration shown in FIG. 2. Also, base stations $BS_A$ and $BS_B$ shown in FIG. 1 both employ the configuration shown in FIG. 3. In addition, mobile station 100 receives an OFDM symbol, which is a multicarrier signal transmitted from base station 200.

In mobile station 100 shown in FIG. 2, the OFDM symbol received through antenna 101 is subjected to receiving processing such as down-conversion and A/D conversion, in radio receiving section 102, then has the GI removed in GI removing section 103, and is inputted to FFT (Fast Fourier Transform) section 104.

FFT section 104 performs FFT processing on the OFDM symbol, extracts symbols allocated to the subcarriers and outputs the symbols equaling one OFDM to demultiplexing section 105 in parallel.

Demultiplexing section 105 divides the symbols inputted from FFT section 104 into pilot symbols and data symbols, and outputs the data symbols to P/S section (parallel-to-serial conversion section) 106 and the pilot symbols to interference level measuring section 107 and channel estimation section 108.

P/S section 106 converts data symbol sequences inputted in parallel from demultiplexing section 105 to serial, and outputs the serial data symbol sequences to switch 109.

Interference level measuring section 107 measures the interference level of the pilot symbols and outputs the result to switching control section 110. If mobile station 100 is the mobile station $MS_A$ shown in FIG. 1, this interference level equals the level of the interfering wave that mobile station $MS_A$ receives from base station $BS_B$.

Channel estimation section 108 determines a channel estimation value (for instance, channel variation level) for each subcarrier, using the pilot symbols, and outputs the channel estimation value with the pilot symbols, to switch 111.

Here, MMSE combining needs to be performed in mobile station 100 when mobile station 100 is located near the cell boundary and the level of the interfering wave from neighboring cells is relatively high. Then, switching control section 110 compares the interference level measured at interference level measuring section 107 with a threshold value for the interference level, and switches switch 109 and switch 111 based on the comparison result.

That is, when the interference level is equal to or more than a threshold value, switching control section 110 controls switch 109 and connects P/S section 106 with weight multiplication section 113, and controls switch 111 and connects channel estimation section 108 with weight calculation section 112. That is, in this case, the data symbols outputted from P/S section 106 are inputted to weight multiplication section 113, and the channel estimation value and the pilot symbols outputted from channel estimation section 108 are inputted to weight calculation section 112.

Weight calculation section 112 calculates an MMSE-based interference mitigating weight from the pilot symbols and the channel estimation value, and outputs the result to weight multiplication section 113.

Weight multiplication section 113 multiplies the data symbols by the interference mitigating weight and outputs the result to combining section 114.

Combining section 114 combines the data symbols multiplied by the interference mitigating weight in repetition units, that is, combines the same data symbols generated by the repetition in base station 200. As a result, MMSE combining is performed.

The symbol after MMSE combining is demodulated in demodulation section 115 and decoded in decoding section 116. As a result, received data is obtained.

On the other hand, if the interference level is less than the threshold value, switching control section 110 controls switch 109 and connects P/S section 106 with channel compensation section 117, and controls switch 111 and connects channel estimation section 108 with channel compensation section 117. In this case, the data symbols outputted from P/S section 106 and the channel estimation value and the pilot symbols outputted from channel estimation section 108 are inputted to channel compensation section 117. Then, channel compensation section 117 compensates for the channel variation (phase variation and amplitude variation) of the data symbols based on the channel estimation value, and outputs the data symbols after channel variation compensation, to demodulation section 115. That is, in this case, the data symbols outputted from P/S section 106 are inputted to demodulation section 115, without passing through weight multiplication section 113 and combining section 114, demodulated in demodulation section 115, and decoded in decoding section 116. As a result, received data is obtained. The channel estimation value and the pilot symbols outputted from channel estimation section 108 are not inputted to weight calculation section 112, and so, weight calculation is not performed in weight calculation section 112. If the interference level is less than the threshold value, repetition is not performed in base station 200 according to the present embodiment.

Thus, in the present embodiment, if the interference level is equal to or more than the threshold value, MMSE combining of the same data symbols is performed, and demodulation processing of the symbols after MMSE combining is performed. On the other hand, If the interference level is less than a threshold value, MMSE combining is not performed and demodulation processing per symbol is performed. That is, in the present embodiment, MMSE combining is performed only when the interference level is relatively high, thereby enabling effective interference mitigating symbol combining.

If the interference level is equal to or more than the threshold value, switching control section 110 commands signal generating section 118 to generate a request signal, and signal generating section 118 generates a request signal in accordance with this command. This request signal serves to request base station 200 to generate a plurality of same symbols, so as to enable mobile station 100 to perform MMSE combining. That is, the request signal serves to request base station 200 to perform a repetition. For instance, when mobile station 100 is the mobile station $MS_A$ shown in FIG. 1, the request signal serves as mobile station $MS_A$ requests the base station $BS_A$ and the base station $BS_B$ to perform repetition. Moreover, when base station $BS_A$ has already performed repetition with respect to mobile station $MS_A$, the request signal serves to request base station $BS_B$ of the neighboring cell (cell B) to perform a repetition. This request signal is modulated in modulation section 119, and the result is inputted to multiplexing section 122. This request signal includes the number of symbol repetitions, that is, the repetition factor (RF).

Coding section 120 performs coding processing on the transmission data as inputted (i.e. bit sequence), and modulation section 121 performs modulation processing over the transmission data after the coding, thereby generating data symbols.

Multiplexing section 122 multiplexes the request signal inputted from modulation section 119 as control data, by the transmission data inputted from modulation section 121, and outputs the result to radio transmission section 123. The multiplexing method at multiplexing section 122 may be any of time multiplexing, frequency multiplexing and code multiplexing.

The transmission data on which the control data is multiplexed is subjected to transmission processing such as D/A conversion, amplification and up-conversion in radio transmission section 123, and then the data after the transmission processing is transmitted from antenna 101 to base station 200 shown in FIG. 3.

Thus, in the present embodiment, the request signal is transmitted when the interference level is equal to or more than the threshold value.

Next, the configuration of base station 200 shown in FIG. 3 will be described.

In base station 200, a radio signal from mobile station 100 received at antenna 201 is subjected to reception processing such as down-conversion and A/D conversion in radio receiving section 202, and then inputted to demultiplexing section 203.

Demultiplexing section 203 divides the signal inputted from radio receiving section 202 into the signal of the control data part, and outputs the control data part to demodulation section 206 and the rest of the signal to demodulation section 204.

Demodulation section 204 demodulates the inputted signal, and decoding section 205 decodes the demodulated signal. As a result, received data is obtained. Demodulation section 206 demodulates the signals of the control data part and obtains the control data. This control data is inputted to MCS control section 210 and RF (Repetition Factor) control section 211. Also, this control data is transmitted to the control station RNC shown in FIG. 1 through a wired network, and from the control station RNC to the base station in the neighboring cell. For instance, when mobile station 100 is mobile station $MS_A$ shown in FIG. 1, the control data is received at base station $BS_A$ and then transmitted to base station $BS_B$ through the control station RNC.

Coding section 207 performs coding processing on the inputted transmission data (i.e. bit sequence), and modulation section 208 performs modulation processing on the transmission data after the coding to generate data symbols. The coding rate R at coding section 207 and the modulation scheme at modulation section 208 are subject to the control by MCS (Modulation and Coding Scheme) control section 210.

Under the control by RF control section 211, in response to the request from mobile station 100, repetition section 209 repeats each data symbol inputted from modulation section 208 to generate a plurality of same data symbols, and outputs the symbols to S/P section (serial-to-parallel conversion section) 212. This plurality of same data symbols forms one unit, referred to as the "repetition unit". In mobile station 100 shown in FIG. 2, as described above, interference mitigation is performed by combining data symbols on a per repetition unit basis.

In response to the control data, that is, the request signal from mobile station 100, MCS control section 210 controls the coding rate R at coding section 207 and a modulation scheme at modulation section 208. MCS control section 210 increases the coding rate R when the repetition factor becomes greater. MCS control section 210 increases the modulation level by changing the modulation scheme from BPSK to QPSK, from QPSK to 8 PSK, from 8 PSK to 16 QAM, and from 16 QAM to 64 QAM when the repetition factor becomes greater. Here, the coding rate and the modulation scheme may both be changed or only one of the coding rate and the modulation scheme may be changed.

In response to the control data, that is, the request signal from mobile station 100, RF control section 211 controls the number of symbol repetitions (number of duplicated symbols) at repetition section 209, that is, the repetition factor.

The MCS control and the RF control will be described later in detail.

S/P section 212 converts the data symbol sequences inputted in serial from repetition section 209 into parallel data symbols, and outputs the result to multiplexing section 213. By this serial-to-parallel conversion, the data symbols are allocated to a plurality of subcarriers forming a multicarrier signal.

Every time a predetermined number of data symbols (for example, one frame) are inputted from S/P section 212, multiplexing section 213 selects and outputs the pilot symbols, thereby time multiplexing the data symbols and the pilot symbols.

IFFT (Inverse Fast Fourier Transform) section 214 performs IFFT on a plurality of subcarriers where the pilot symbol or the data symbol is allocated to obtain an OFDM symbol, which is a multicarrier signal.

GI attaching section 215 attaches the same signal as the tail part of an OFDM symbol, to the beginning of that OFDM symbol to provide a guard interval (GI).

Radio transmission section 216 performs transmission processing such as D/A conversion, amplification and up-conversion, on the OFDM symbol, with an attachment of a GI, and transmits the result from antenna 201 to mobile station 100 shown in FIG. 1.

Next, MCS control and RF control will be described in detail.

Usually, when request signals are not received from mobile station 100, RF control section 211 sets the repetition factor of repetition section 209 to RF=1. That is, usually, when repetition section 209 outputs the data symbols inputted from modulation section 208 through S/P section 212. Specifically, repetition is not performed, usually, when request signals are not received from mobile station 100.

On the other hand, if a request signal is received from mobile station 100, RF control section 211 sets the repetition factor included in the request signal, in repetition section 209. Specifically, repetition section 209 performs repetition in response to the request from mobile station 100.

Here, since a plurality of same data symbols are generated when repetition is performed, the transmission rate of the data symbols decreases. To prevent the decrease of this transmission rate, when repetition is performed in repetition section 209, one of or both the coding rate and modulation level are increased.

To be more specific, MCS control section 210 has the MCS table shown in FIG. 4, and performs MCS control in accordance with this table. For instance, if MCS1 (R=⅛, QPSK) is used usually when the request signals are not received from mobile station 100 (specifically, when RF=1), upon the request signal showing that RP=2 is received from the mobile station, MCS control section 210 changes the MCS to MCS1' (R=¼, QPSK). Similarly, if one of MCS2 and MCS3 is used as usual, each MCS is changed to MCS2' or MCS3', in accordance with this MCS table.

Figure 5:
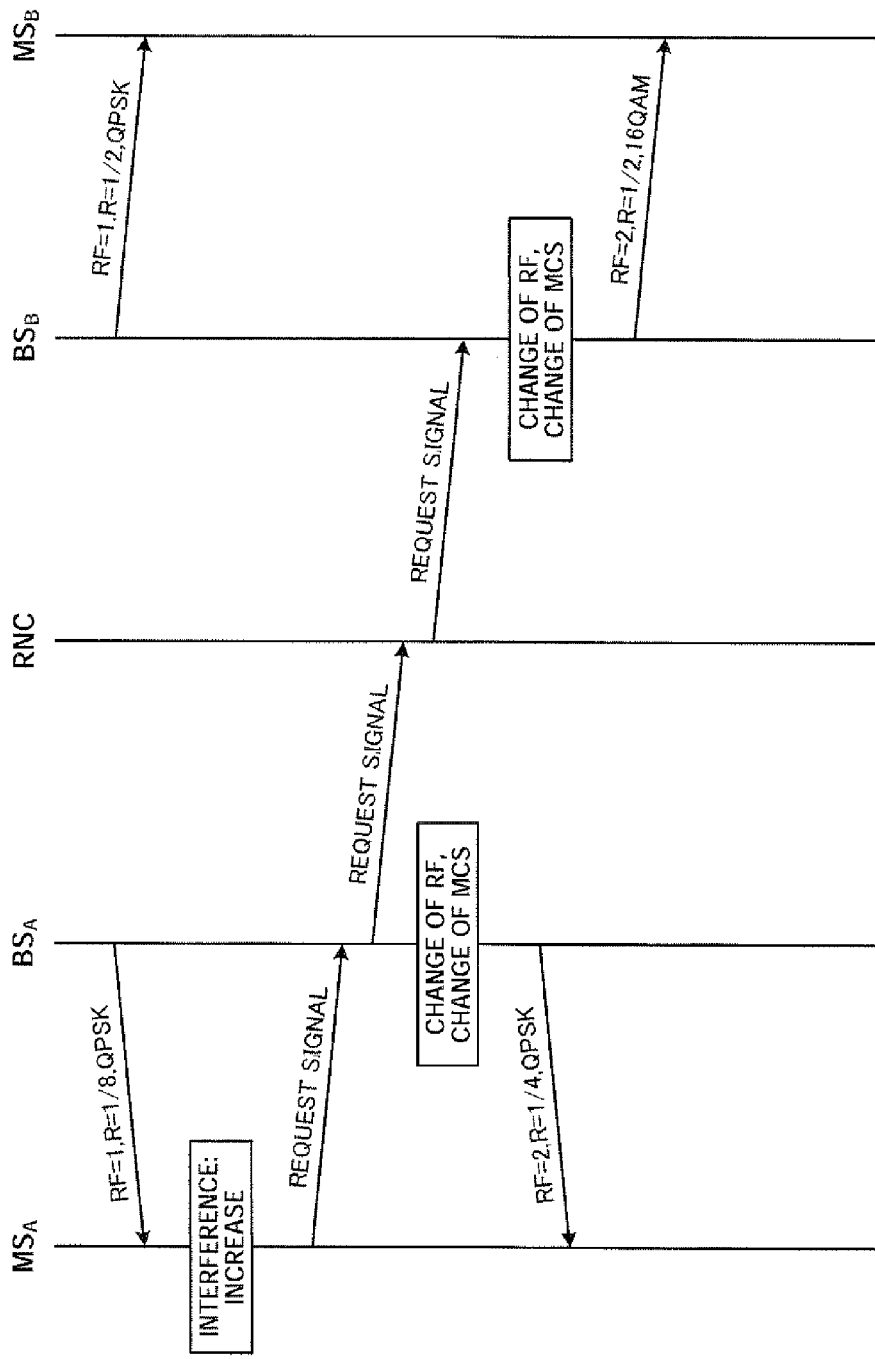
FIG. 5 is an operation sequence diagram (pattern 1) of the mobile communication system, according to Embodiment 1 of the present invention.

Next, the operation sequence of the mobile communication system shown in FIG. 1 will be described below using FIG. 5. As shown in FIG. 5, in an initial state, base station $BS_A$ performs transmission to mobile station $MS_A$ using RF=1 and MCS1 (R=⅛, QPSK), and base station $BS_B$ performs transmission to mobile station $MS_B$ using RF=1 and MCS2 (R=½, QPSK).

When mobile station $MS_A$ moves to near the cell boundary of cell A and the interference from cell B increases and the interference level becomes equal to or more than the threshold value, mobile station $MS_A$ transmits the request signal (RF=2) as control data, to base station $BS_A$. This request signal is transmitted from base station $BS_A$ to base station $BS_B$ through the control station RNC using a wired network.

The base station $BS_A$, receiving the request signal, changes the repetition factor to RF=2, changes the MCS from MCS1 to MCS1' (R=¼, QPSK) and performs transmission to mobile station $MS_A$.

Meanwhile, the base station $BS_B$, receiving the request signal, changes the repetition factor to RF=2, changes the MCS from MCS2 to MCS2' (R=½, 16 QAM) and performs transmission to mobile station $MS_B$.

Figure 6:
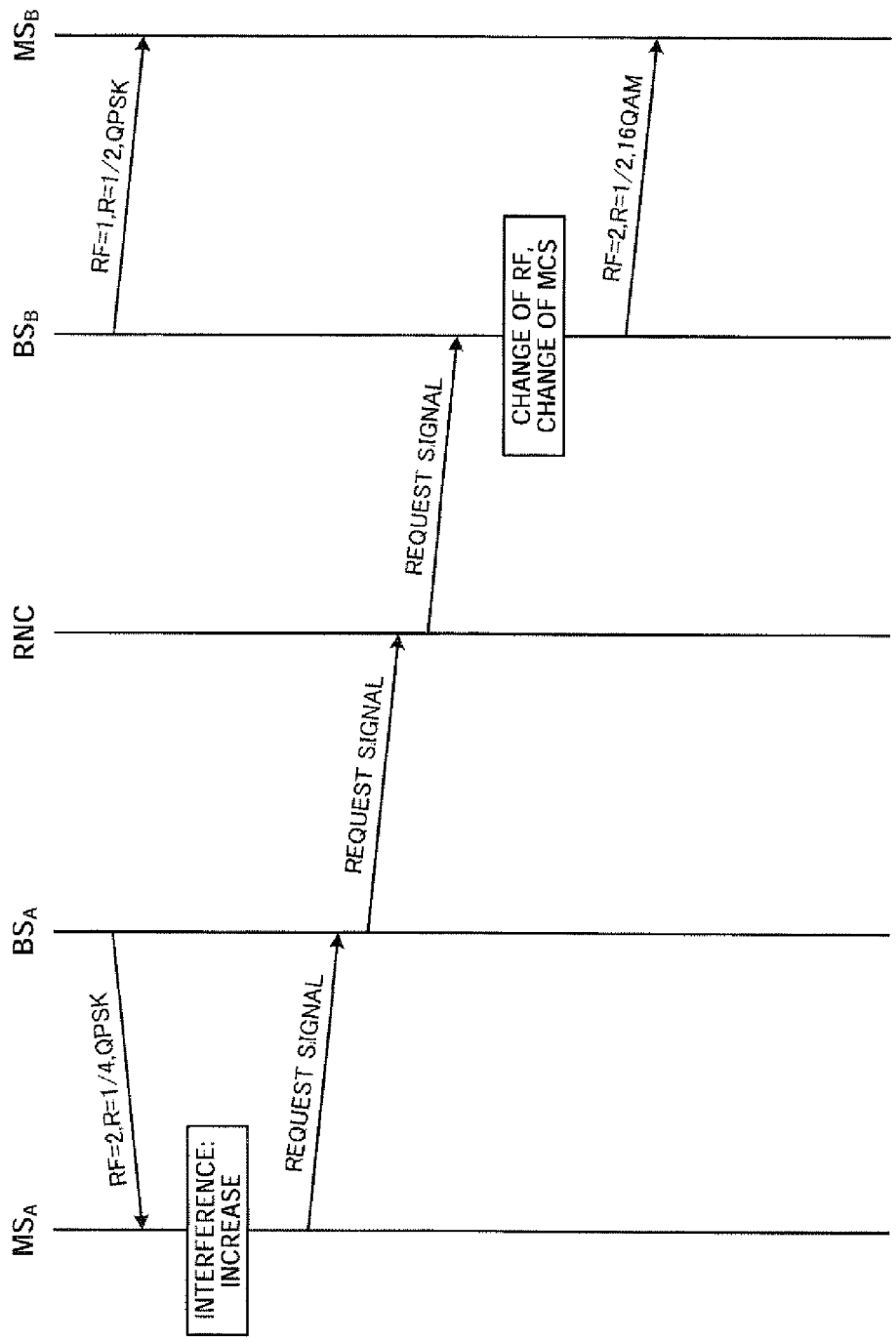
FIG. 6 is an operation sequence diagram (pattern 2) of the mobile communication system, according to Embodiment 1 of the present invention.

As shown in FIG. 6, in an initial state, if base station $BS_A$ performs transmission to mobile station $MS_A$ using RF=2 and MCS1' (R=¼, QPSK), base station $BS_A$ has already been performing repetition at the time the request signal is received and therefore does not change the repetition factor and the MCS. Meanwhile, base station $BS_B$ changes the repetition factor and the MCS similar to FIG. 5.

Figure 7:
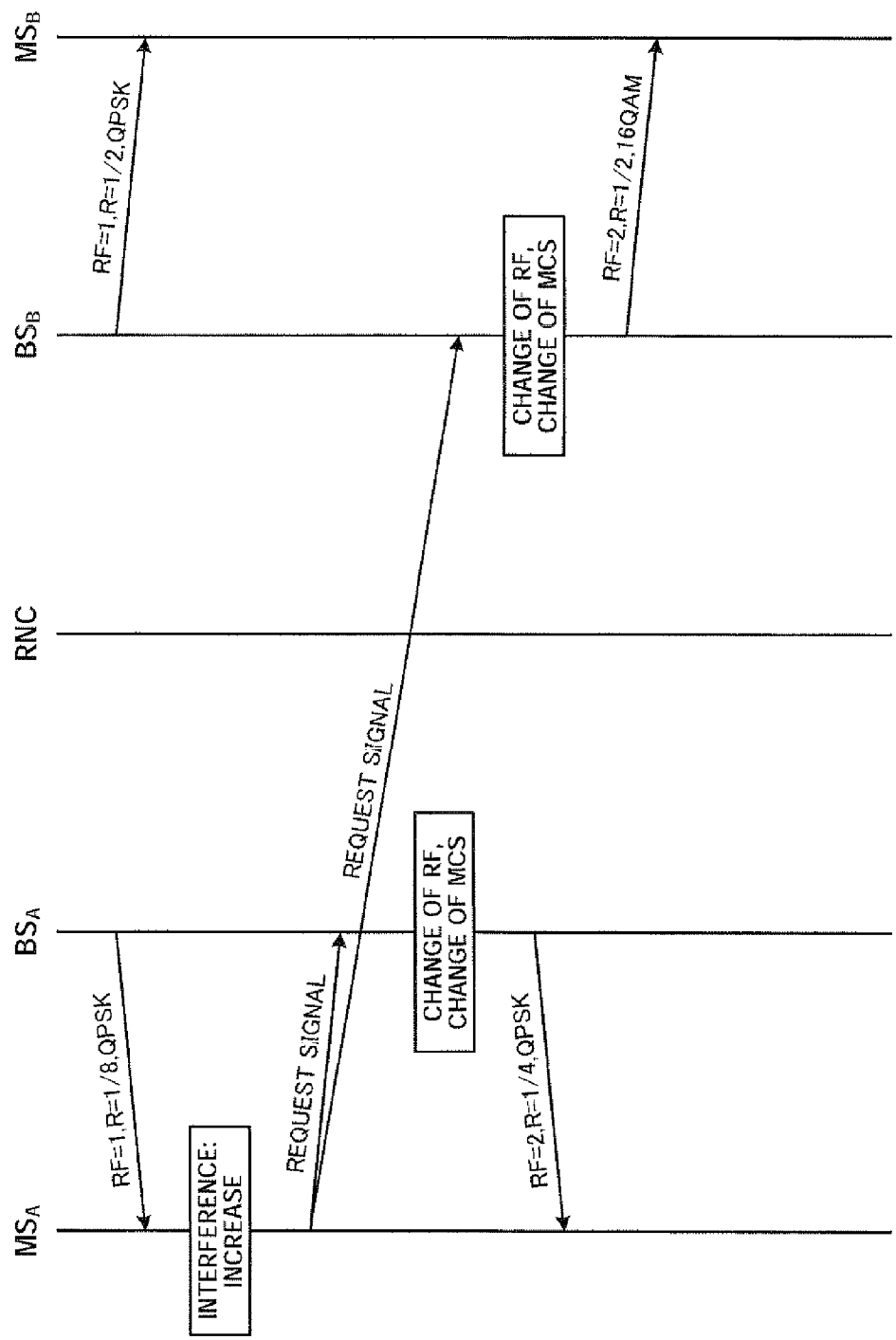
FIG. 7 is an operation sequence diagram (pattern 3) of the mobile communication system, according to Embodiment 1 of the present invention.

Moreover, as shown in FIG. 7, the request signal to base station $BS_B$ may be directly transmitted from mobile station $MS_A$ to base station $BS_B$ by radio communication.

Moreover, mobile station $MS_A$ may report the interference level to base station $BS_A$, instead of transmitting the request signal. Then, when the reported interference level is equal to or more than the threshold value, base station $BS_A$ may transmit the request signal to base station $BS_B$, through the control station RNC using a wired network.

In the above-described operation sequence, if mobile station $MS_A$ is located near the cell boundary of cell A and interference from cell B increase more, the number of symbol repetitions in the desired wave and the number of symbol repetitions in interfering waves can be matched. Consequently, mobile station $MS_A$ can perform interference mitigating symbol combining. Moreover, only when mobile station $MS_A$ is located near the cell boundary of cell A and interference from cell B increase more, repetition is performed in base station $BS_B$ (specifically, the base station of a neighboring cell), so that it is possible to prevent base station $BS_B$ from Performing unnecessary repetition and prevent a decrease of the transmission rate for transmission data to mobile station $MS_B$. Further, if repetition is performed in base station $BS_B$, at the same time, one of or both the coding rate and the modulation level are increased. As a result, even when interference mitigating symbol combining is performed in mobile station $MS_A$, the decrease of the transmission rate for transmitting data to mobile station $MS_B$ can be prevented.

Figure 8:
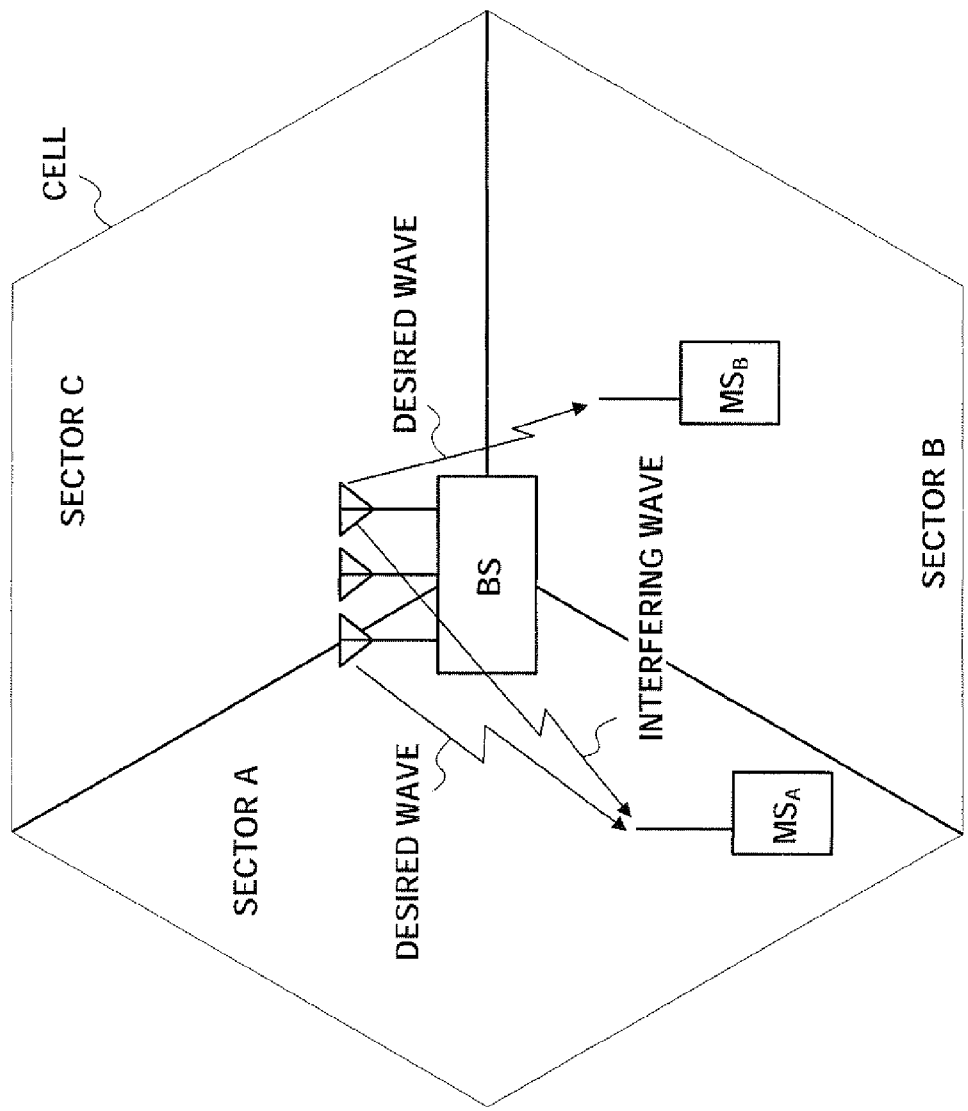
FIG. 8 is a configuration diagram (pattern 2) of the mobile communication system, according to Embodiment 1 of the present invention.

Furthermore, although the case has been explained above where the present invention is implemented between neighboring cells, the present invention may also be implemented between neighboring sectors inside the same cell. For instance, in a three-sector model mobile communication system as shown in FIG. 8, the present invention may also be implemented between sector A and sector B neighboring each other. That is, in the above description, by regarding cell A as sector A and cell B as sector B, the present invention may also be implemented. Consequently, in FIG. 8, the data to be transmitted from base station BS to mobile station $MS_A$ located in sector A is the desired wave for mobile station $MS_A$, and the data to be transmitted from base station BS to mobile station $MS_B$ located in sector B is the desired wave for mobile station $MS_B$ and the interfering wave for mobile station $MS_A$.

In this way, when sector A neighbors sector B and mobile station $MS_A$ is located near the sector boundary of sector A, mobile station $MS_A$ receives the data transmitted to sector A, as a desired wave. At the same time, mobile station $MS_A$ also receives data transmitted to sector B, as an interfering wave. When mobile station $MS_A$ is located near the sector boundary of sector A, by performing MMSE combining on these data, the interfering wave is suppressed.

Figure 9:
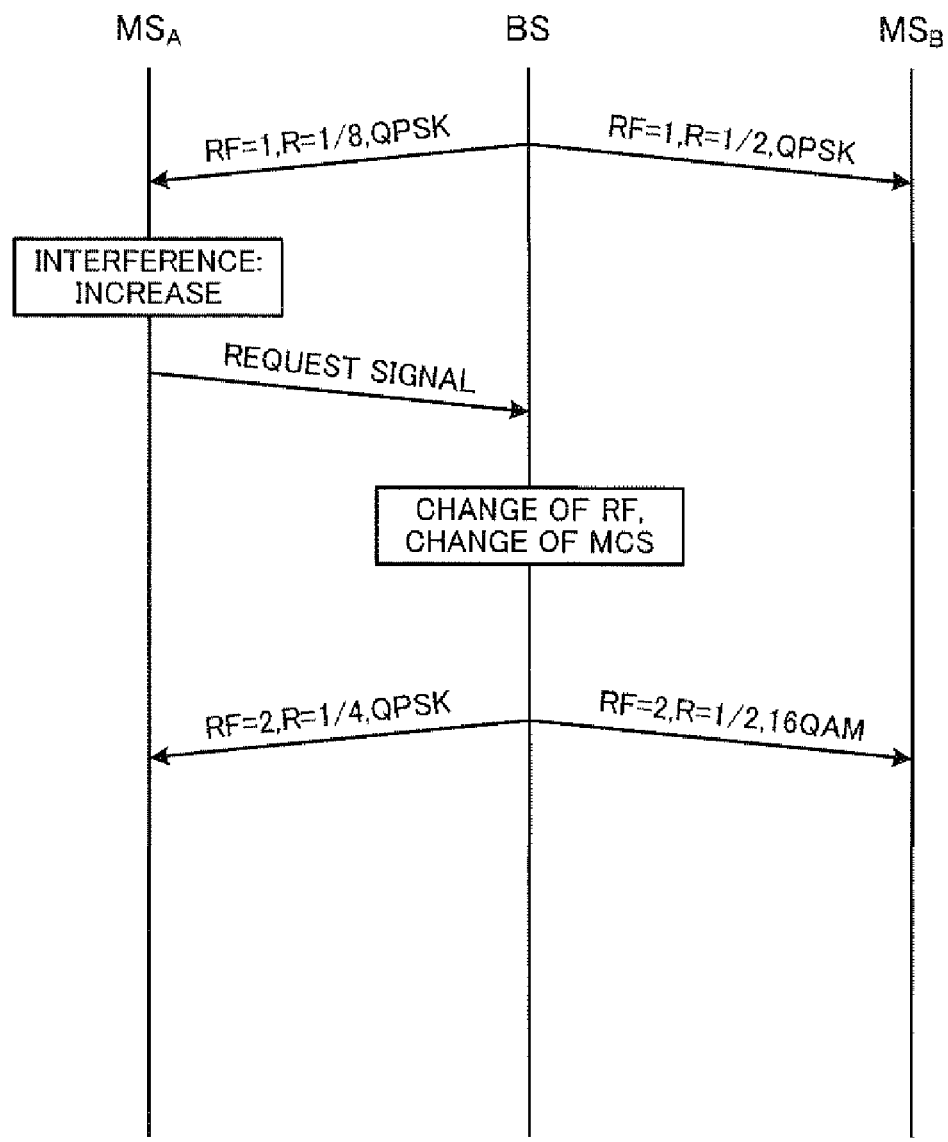
FIG. 9 is an operation sequence diagram (pattern 4) of the mobile communication system, according to Embodiment 1 of the present invention.

Next, the operation sequence of the mobile communication system shown in FIG. 8 will be described below using FIG. 9. In FIG. 9, in an initial state, base station BS performs transmission to mobile station $MS_A$ using RF=1 and MCS1 (R=⅛, QPSK) and performs transmission to mobile station $MS_B$ using RF=1 and MCS2 (R=½, QPSK).

When mobile station $MS_A$ moves to near the sector boundary of sector A and the interference from sector B increases and the interference level becomes equal to or more than the threshold value, mobile station $MS_A$ transmits the request signal (RF=2) as control data, to base station BS.

The base station BS, receiving the request signal, changes the repetition factor of the data to be transmitted to mobile station $MS_A$ to RF=2, changes the MCS from MCS1 to MCS1' (R=¼, QPSK) and performs transmission to mobile station $MS_A$. Moreover, the base station BS changes the repetition factor of the data to be transmitted to mobile station $MS_B$ to RF=2, changes the MCS from MCS2 to MCS2' (R=½, 16 QAM) and performs transmission to mobile station $MS_B$.

Figure 10:
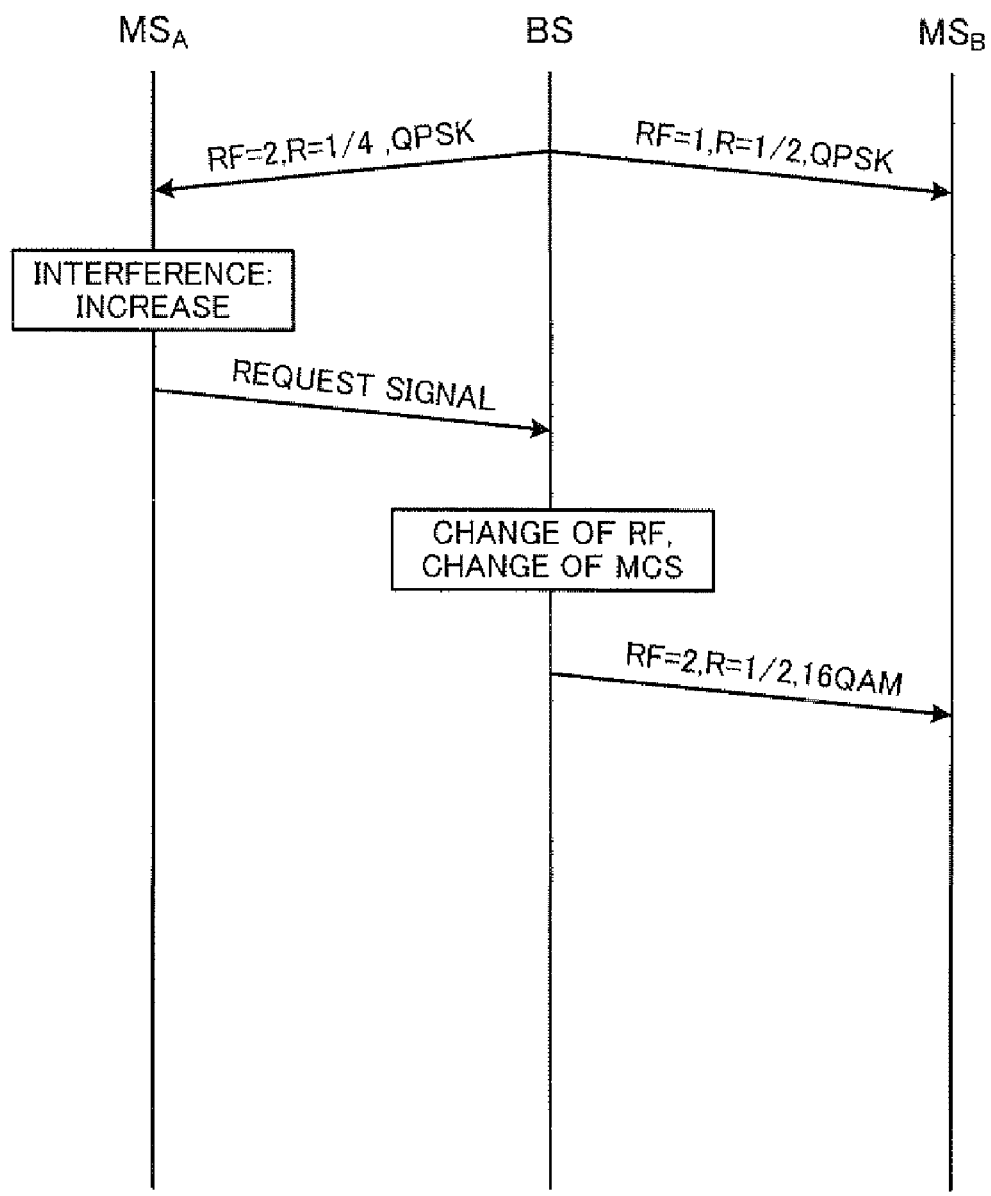
FIG. 10 is an operation sequence diagram (pattern 5) of the mobile communication system, according to Embodiment 1 of the present invention.

Furthermore, as shown in FIG. 10, in an initial state, if base station BS performs transmission to mobile station $MS_A$ using RF=2 and MCS1' (R=¼, QPSK), base station BS has already been performing repetition to mobile station $MS_A$ at the time the request signal is received, and therefore does not change the repetition factor and the MCS to mobile station $MS_A$. Meanwhile, base station BS changes the repetition factor and the MCS for mobile station $MS_B$, similar to FIG. 9.

Incidentally, when the present invention is implemented between neighboring sectors, base station BS has the configuration per sector, as shown in FIG. 3.

In this way, according to the present embodiment, it is possible to perform interference mitigating symbol combining effectively and prevent a decrease of the transmission rate.

Embodiment 2

In embodiment 1, when repetition is carried out, the coding rate is increased and/or the modulation level is raised to prevent the decrease of the transmission rate. Generally, if channel conditions are the same, the error rate performance degrades when the coding rate is increased or the M-ary modulation level is raised, resulting in the decrease of throughput. In the present embodiment, when repetition is carried out, the coding rate is increased and/or the modulation level is raised, and transmission power increases, thereby preventing the error rate performance degradation.

Figure 11:
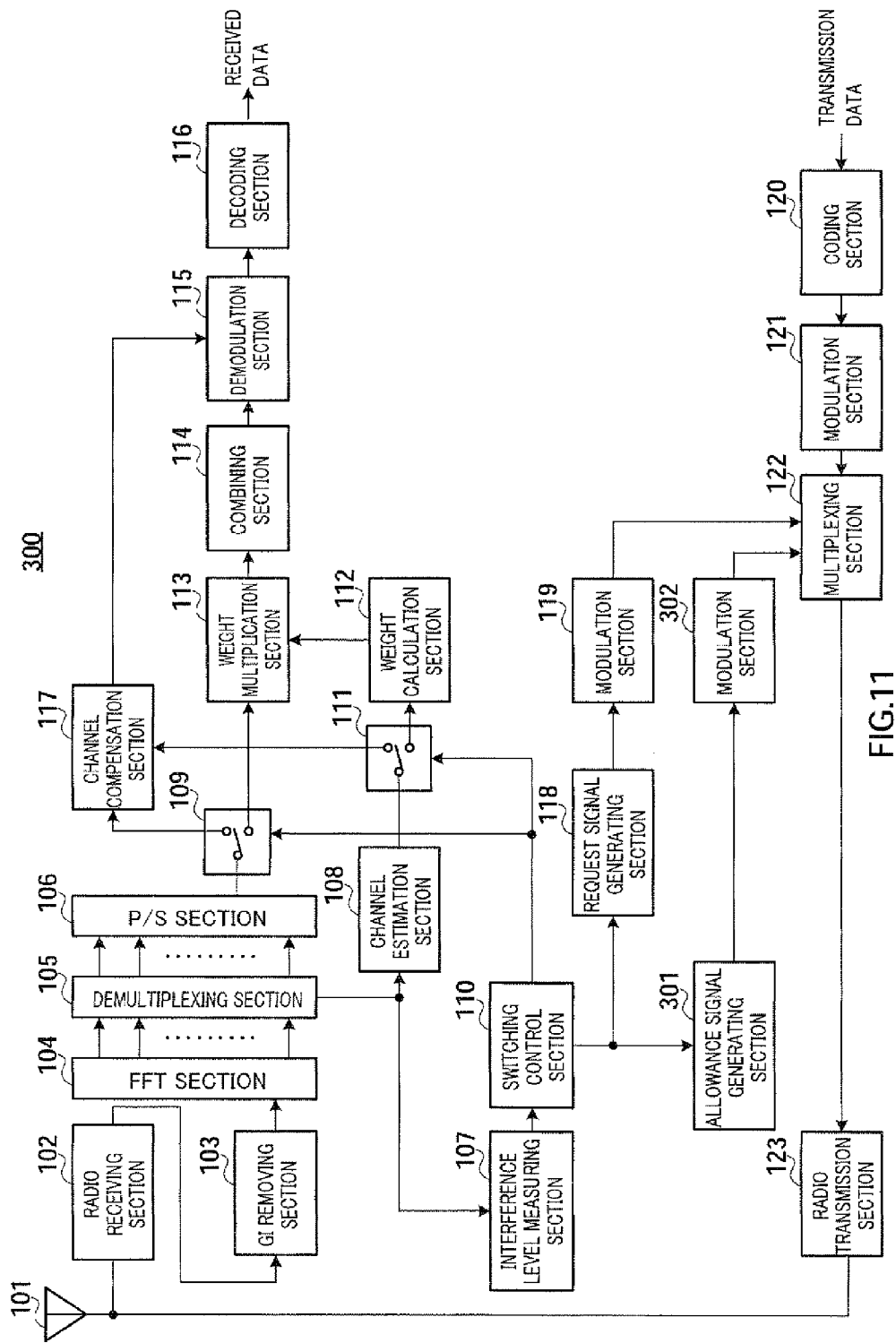
FIG. 11 is a block diagram showing a configuration of a mobile station, according to Embodiment 2 of the present invention.
Figure 12:
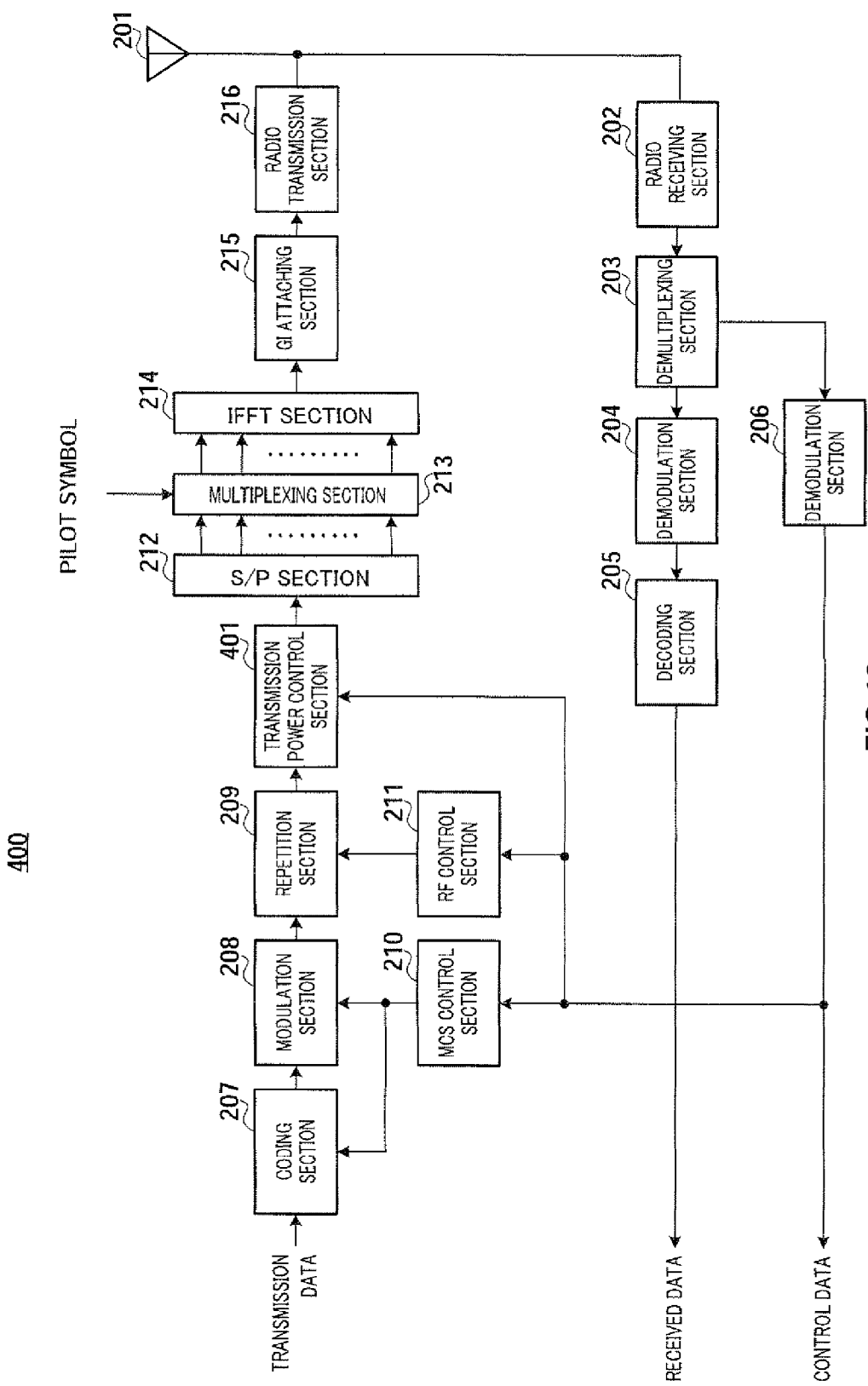
FIG. 12 is a block diagram showing a configuration of a base station, according to Embodiment 2 of the present invention.

FIG. 11 shows the configuration of mobile station 300 according to the present embodiment. Moreover, FIG. 12 shows the configuration of base station 400 according to the present embodiment. In FIGS. 11 and 12 the same reference parts are assigned to the same numerals in Embodiment 1 (FIGS. 2 and 3), and description thereof will be omitted.

In mobile station 300, if the interference level becomes equal to or more than a threshold value, switching control section 110 further commands allowance signal generating section 301 to generate an allowance signal. Allowance signal generating section 301 generates an allowance signal in accordance with the above command. This allowance signal serves to allow base station 400 to increase transmission power. For instance, if mobile station 300 serves as mobile station $MS_A$ shown in FIG. 1, this allowance signal serves as mobile station $MS_A$ allows base station $BS_A$ and base station $BS_B$ to increase transmission power. If base station $BS_A$ has already performed repetition with respect to mobile station $MS_A$, this allowance signal serves to allow base station $BS_B$ in the neighboring cell (cell B) to increase transmission power. This allowance signal is modulated in modulation section 302, and the result is inputted to multiplexing section 122.

Multiplexing section 122 multiplexes both the request signal inputted from modulation section 119 and the allowance signal inputted from modulation section 302, as control data, on the transmission data inputted from modulation section 121, and outputs the result to radio transmission section 123.

The transmission data on which the control data is multiplexed is subjected to transmission processing such as D/A conversion, amplification and up-conversion in radio transmission section 123, and then the result is transmitted from antenna 101 to base station 400 as shown in FIG. 12.

Thus, in the present embodiment, the allowance signal is transmitted when the interference level is equal to or more than the threshold value.

In base station 400 shown in FIG. 12, in accordance with the allowance signal included in the control data, transmission power control section 401 controls transmission power of the data symbols outputted from repetition section 209. When the allowance signal is transmitted from mobile station 300, the request signal is also transmitted at the same time so that base station 400 is allowed to increase transmission power upon carrying out repetition. Consequently, when repetition section 209 performs repetition, transmission power control section 401 increases transmission power of the same data symbols generated through repetition. However, when base station 400 is base station $BS_A$ shown in FIG. 1, even when allowed to increase transmission power, base station 400 does not increase transmission power. The reason is that, in mobile station $MS_A$ that receives the desired wave from base station $BS_A$, when the interference level is high, performing MMSE combining makes it possible to prevent an error rate performance degradation.

Figure 13:
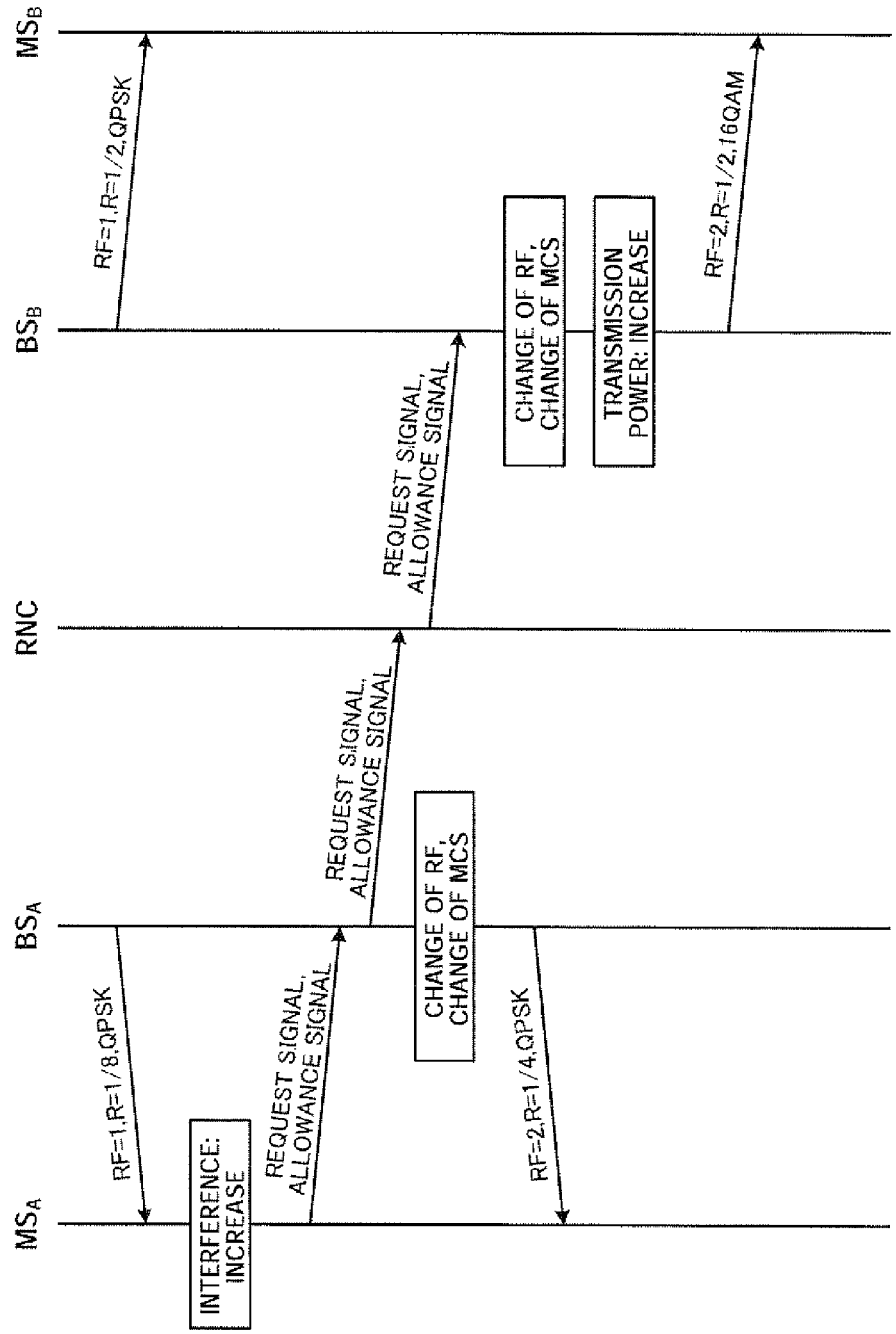
FIG. 13 is an operation sequence diagram (pattern 1) of a mobile communication system, according to Embodiment 2 of the present invention.

Next, the operation sequence of the mobile communication system shown in FIG. 1 will be described below using FIG. 13. In FIG. 13, in an initial state, similar to the above-described FIG. 5, base station $BS_A$ performs transmission to mobile station $MS_A$ using RF=1 and MCS1 (R=⅛, QPSK), and base station $BS_B$ performs transmission to mobile station $MS_B$ using RF=1 and MCS2 (R=½, QPSK).

When mobile station $MS_A$ moves to near the cell boundary of cell A and consequently as a result the interference from base station $BS_B$ increases and the interference level becomes equal to or more than the threshold value, mobile station $MS_A$ transmits a request signal (RF=2) and an allowance signal as control data, to base station $BS_A$. The request signal and the allowance signal are transmitted from base station $BS_A$ to base station $BS_B$ through control station RNC using a wired network.

Base station $BS_A$, receiving the request signal and the allowance signal, changes the repetition factor to RF=2, changes the MCS from MCS1 to MCS1' (R=¼, QPSK) and performs transmission to mobile station $MS_A$. However, base station $BS_A$ does not increase transmission power even if base station $BS_A$ receives the allowance signal.

Figure 14:
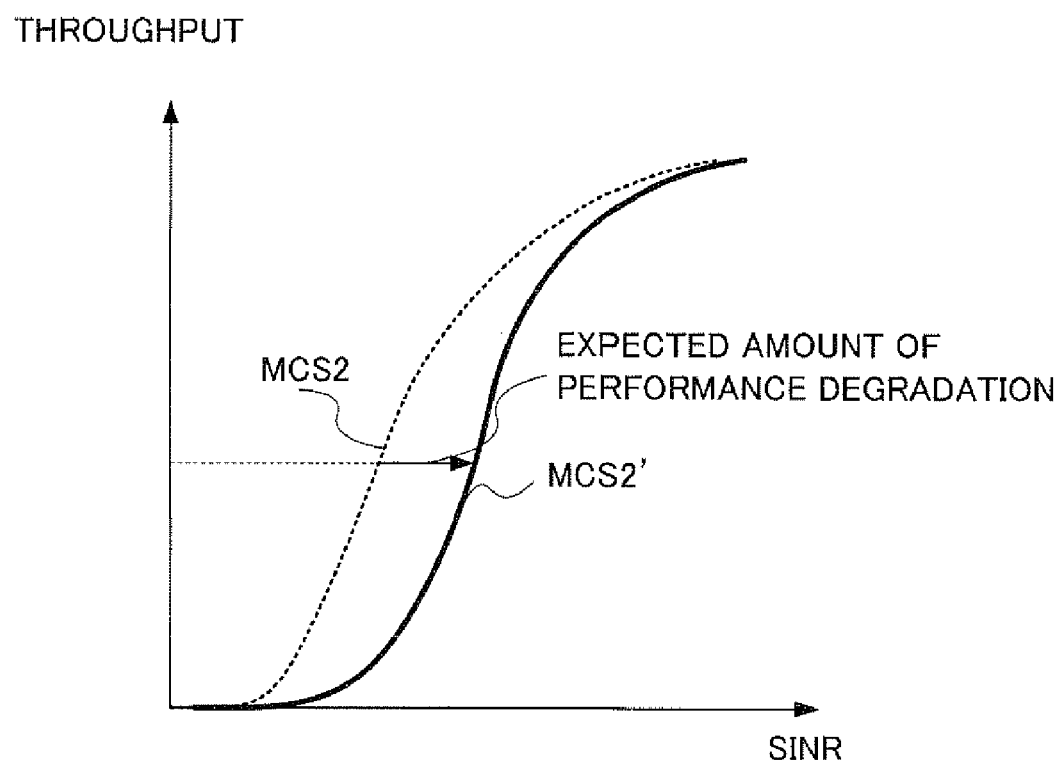
FIG. 14 is a reception performance graph according to Embodiment 2 of the present invention.

Meanwhile, base station $BS_B$, receiving the request signal and the allowance signal, changes the repetition factor to RF=2, changes the MCS from MCS2 to MCS2' (R=½, 16 QAM) and performs transmission to mobile station $MS_B$. Further, based on the reception performance diagram shown in FIG. 14, base station $BS_B$ increases transmission power, equaling expected performance degradation by changing the MCS from MCS2 to MCS2'. This enables received quality (received SINR in FIG. 14) at mobile station $MS_B$ to be improved by equaling transmission power improvement, so that it is possible to prevent the error rate performance degradation in response to a raising in the modulation level and to maintain the throughput between base station $BS_B$ and mobile station $MS_B$. Further, when transmission power from base station $BS_B$ increases, the interference level at mobile station $MS_A$ also increases. However, MMSE combining can be performed when the interference level at mobile station $MS_A$ is high, and even if the interference level increases a little, received quality does not degrade much.

Furthermore, although cases have been described with the above description where the present invention is implemented between neighboring cells, the present invention may also be implemented between neighboring sectors inside the same cell, similar to Embodiment 1. For instance, the present invention may also be implemented in the three sector-model mobile communication system as shown in FIG. 8, between neighboring sector A and sector B.

Figure 15:
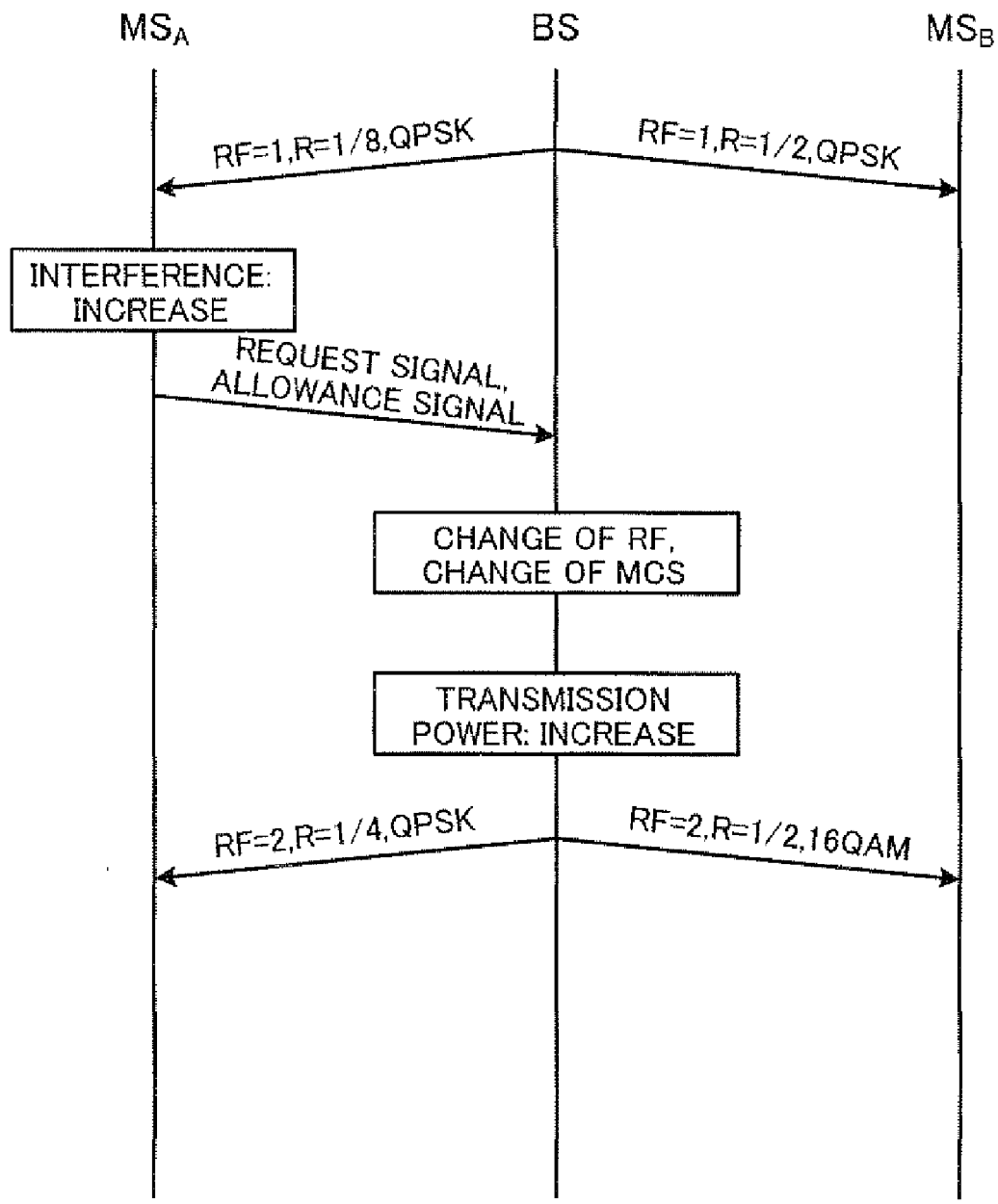
FIG. 15 is an operation sequence diagram (pattern 2) of the mobile communication system, according to Embodiment 2 of the present invention.

Next, the operation sequence of the mobile communication system shown in FIG. 8 will be described using FIG. 15. In FIG. 15, in an initial state, base station BS performs transmission to mobile station $MS_A$ using RF=1 and MCS1 (R=⅛, QPSK) and to mobile station $MS_B$ using RF=1 and MCS2 (R=½, and QPSK), similar to FIG. 9.

When mobile station $MS_A$ moves to near the sector boundary of sector A and the interference from sector B increases and the interference level becomes equal to or more than the threshold value, mobile station $MS_A$ transmits the request signal (RF=2) and the allowance signal as control data, to base stations BS.

Base station BS, receiving the request signals and the allowance signal, changes the repetition factor of the data to be transmitted to mobile station $MS_A$ to RF=2, changes the MCS from MCS1 to MCS1' (R=¼, QPSK) and performs transmission to mobile station $MS_A$. Moreover, base station BS changes the repetition factor of the data transmitted to mobile station $MS_B$ to RF=2, changes the MCS from MCS2 to MCS2' (R=½, 16 QAM) and performs transmission to mobile station $MS_B$. Further, based on the reception performance graph of FIG. 14, in base station BS, transmission power to mobile station $MS_B$ increases by equaling expected performance degradation by changing the MCS from MCS2 to MCS2'. However, base station BS does not increase transmission power for mobile station $MS_A$ even if base station MS receives the allowance signal.

In the above embodiments, whether the symbol combining processing is performed or not depends on the interference level. However, a configuration may also be employed in which maximum-ratio-combining and MMSE combining are switched in response to the interference level. That is, if, from the desired base station and the interfering base station, the desired station always performs repetition and the mobile station performs maximum-ratio-combining, and if the interference level becomes equal to or more than the threshold value, repetition may also be performed in the interfering station, and MMSE combining may be performed in the mobile station, as described above.

Moreover, the base stations may be referred to as "Node B", the mobile stations may be referred to as "UE" and the subcarriers may be referred to as "Tone".

Moreover, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-177780, filed on Jun. 17, 2005, the entire content of which is expressly incorporated by reference herein.

INDUSTRIAL APPLICABILITY

The present invention is applicable, for example, to mobile communication systems.

The invention claimed is:

1. A radio communication base station apparatus that transmits a multicarrier signal formed with a plurality of subcarriers, the radio communication base station apparatus comprising:
   a repetition section that repeats a symbol to generate a plurality of same symbols in response to a request from a radio communication mobile station apparatus or a radio communication base station apparatus of a neighboring cell;
   a modulation and coding scheme control section that changes, when the repetition section performs the repetition, at least one of an modulation level and a coding rate of the symbol; and
   a transmission section that transmits the multicarrier signal in which the plurality of same symbols are allocated to the plurality of subcarriers.

2. The radio communication base station apparatus according to claim 1, wherein, when the repetition section performs the repetition, the modulation and coding scheme control section raises the modulation level.

3. The radio communication base station apparatus according to claim 1, wherein, when the repetition section performs the repetition, the modulation and coding scheme control section increases the coding rate.

4. The radio communication base station apparatus according to claim 1, further comprising a power control section that increases transmission power of the plurality of same symbols when the repetition section performs the repetition.

5. A radio communication mobile station apparatus that receives a multicarrier signal formed with a plurality of subcarriers, the radio communication mobile station apparatus comprising:
   a transmission section that transmits a request signal for requesting a radio communication base station apparatus to generate a plurality of same symbols when an interference level becomes equal to or more than a threshold value;
   a receiving section that receives the multicarrier signal in which the plurality of same symbols are allocated to the plurality of subcarriers; and
   a combining section that combines the plurality of same symbols.

6. The radio communication mobile station apparatus according to claim 5, wherein the receiving section receives the multicarrier signal, in which at least one of a modulation level and a coding rate of the plurality of same symbols is changed in response to the request signal at the radio communication base station apparatus.

7. The radio communication mobile station apparatus according to claim 5, wherein the combining section combines the plurality of same symbols and another plurality of same symbols, the other plurality of same symbols being transmitted from another radio communication base station apparatus of a neighboring cell and a coding rate of the other plurality of same symbols being changed in response to the request signal at the other radio communication base station apparatus.

8. The radio communication mobile station apparatus according to claim 5, wherein the transmission section further transmits an allowance signal that allows the radio communication base station apparatus to increase transmission power.

9. The radio communication mobile station apparatus according to claim 8, wherein, when the interference level becomes equal to or more than the threshold value, the transmission section transmits the allowance signal.

10. A radio communication method at a radio communication base station apparatus transmitting a multicarrier signal to a radio communication mobile station apparatus that combines a plurality of same symbols included in the multicarrier signal to suppress interference, the radio communication method comprising changing at least one of an modulation level and coding rate when repetition is performed in response to a request from the radio communication mobile station apparatus.

* * * * *